United States Patent [19]

Suga et al.

[11] Patent Number: 4,792,093
[45] Date of Patent: Dec. 20, 1988

[54] ARTIFICIAL SNOW WETTING APPARATUS

[75] Inventors: Nagaichi Suga; Taro Mori; Yoshio Sasho, all of Tokyo, Japan

[73] Assignee: Suga Test Instruments Co., Ltd., Tokyo, Japan

[21] Appl. No.: 163,112

[22] Filed: Mar. 2, 1988

[30] Foreign Application Priority Data

Mar. 4, 1987 [JP] Japan .................. 62-49797

[51] Int. Cl.$^4$ ........................... A01G 15/00
[52] U.S. Cl. ........................... 239/14.2
[58] Field of Search .................. 239/2, 14.1, 14.2

[56] References Cited

U.S. PATENT DOCUMENTS

| | | | |
|---|---|---|---|
| 1,104,920 | 7/1914 | Osborne | 62/74 |
| 3,257,815 | 6/1966 | Brocoff et al. | 62/74 |
| 3,464,625 | 9/1969 | Carlsson | 239/14.2 |
| 3,733,029 | 5/1973 | Eustis et al. | 239/14.2 |
| 3,761,020 | 9/1973 | Tropeano et al. | 239/2.2 |
| 3,829,013 | 8/1974 | Ratnik | 239/14.2 |
| 3,945,567 | 3/1976 | Rambach | 239/14.2 |
| 3,952,949 | 4/1976 | Dupre | 239/14.2 |
| 3,964,682 | 6/1976 | Tropeano et al. | 239/14.2 |
| 4,145,000 | 3/1979 | Smith et al. | 239/14.2 |
| 4,200,228 | 4/1980 | Woerpel | 239/2.2 |

FOREIGN PATENT DOCUMENTS 62-42227 9/1987 Japan .
1150450 4/1985 U.S.S.R. .................. 239/14.2

*Primary Examiner*—Andres Kashnikow
*Assistant Examiner*—Patrick N. Burkhart
*Attorney, Agent, or Firm*—Wenderoth, Lind & Ponack

[57] ABSTRACT

An artificial snow making apparatus including a mechanism for changing artificial snow generated therein to wet snow which includes an apparatus for making artificial snow and a test chamber located therebelow for receiving the generated snow. An air channel is located within the test chamber and connected to the artificial snow generating mechanism. A blower sends air through the air channel for mixing with and carrying the generated snow along a flow path. A mechanism for supplying heated and humidified air to the air channel is disposed at a portion of the flow path which is downstream from where the generated snow is supplied to the air channel. A sample fitting frame is disposed in the air channel at a position downstream of the position along the air channel at which the heated and humidified air is supplied thereto. The sample fitting frame allows a sample, such as a cable, to receive wet snow thereon and the velocity at which the wet snow strikes the sample and the wetness of the generated snow can be adjusted.

13 Claims, 3 Drawing Sheets

ARTIFICIAL SNOW WETTING APPARATUS

BACKGROUND OF THE INVENTION

This invention relates to an artificial snow wetting apparatus for carrying out snow deposition experiments in a strong wind by introducing the snowfall obtained by an artificial snow falling apparatus into an air channel and mixing an air flow flowing at a high velocity through the air channel with heated and humidified air prepared separately for wetting the snow, in order to use the snowfall obtained from the artificial snow falling apparatus for the snow deposition experiments.

The snow obtained by conventional artificial snow falling apparatuses is a dry snow and there has not been available any artificial snow falling apparatus which can provide a wet snow having an arbitrary moisture content.

In the case of a power cable, for example, snow is deposited on the cable during a snowfall and changes to what is known as "cylinder snow", which is subjected to torsion and causes problems such as breakage of the cable. This snow deposition occurs mostly when the snow is a wet snow carried by a strong wind, and the strong wind promotes the breakage of the cable.

Since an artificial snow wetting apparatus has not been available in the past as described above, fundamental snow deposition experiments to develop countermeasures have been carried out inevitably by granulating outdoor natural snow, wetting the snow by mist water or heating the snow and spraying the snow for deposition on the sample (cable) inside an air channel. However, the wet snow obtained by this method has different properties from those of natural snow with the result that a high correlationship cannot be established with snow deposition by the natural phenomenon. Moreover, it has been extremely difficult by this method to examine the relationship between the condition of the wet snow and the snow deposition phenomenon and to conduct other fundamental experiments.

The wet snow is formed under natural conditions in the following way. While the dry snow which is formed in a low temperature zone of a high atmospheric layer is falling, the surface of the snow crystal is partially melted to form water before the snow reaches the ground surface because the temperature and moisture increase with decreasing altitude, and this water covers the remaining snow crystal.

Therefore, the wet snow to be used for the snow deposition experiment must have a property such that the unmolten snow portion consists of the same crystal as that of the natural snow. The quantitative relationship between the water covering the surface of the crystal and the snow portion, that is, the moisture content, changes variously under natural conditions and for this reason, too, the wet snow having different properties under various conditions must be obtained freely and reliably for the purpose of the snow deposition experiment.

With reference to FIG. 1, when an attempt is made to wet the snow in a conventional artificial snow falling apparatus by heating and humidifying the lower part of an inner cylinder 3, which corresponds to an altitude near the ground surface in the natural environment, or the inner part of a test chamber 2, however, the air whose temperature is raised becomes an ascending current and rises inside the inner cylinder 3 so that a convection current occurs inside the inner cylinder in a corresponding way, a low temperature air layer at the upper part of the inner cylinder changes to a descending current against the flow velocity of a variable speed blower 6 and enters the test chamber 2. As a result, snow seed crystals will not grow to a suitable size and weight which becomes falling snow, and the snow cannot be wetted.

Accordingly, the development of a snow wetting apparatus capable of wetting snow obtained by an artificial snow falling apparatus has been desired particularly in the electric power industry in order to use the snow obtained by the snow falling apparatus for snow deposition experiments.

SUMMARY OF THE INVENTION

With the technical background described above, an object of the present invention to provide an artificial snow wetting apparatus which introduces the dry snow obtained by the conventional artificial snow falling apparatus into an air channel and mixes the snow uniformly with air whose temperature and humidity are adjusted separately, while the snow travels inside the air channel together with a high velocity air stream, in order to obtain a wet snow having an arbitrary moisture content carried by an air stream having an arbitrary velocity. The present invention makes it possible to carry out a snow deposition test by placing a sample inside this air channel.

To accomplish the object described above, the present invention employs the following means.

(1) An air channel 12 is connected through a hopper 11 to an opening 9 at the lower end of a vertical inner cylinder of a conventional artificial snow falling apparatus for making the snow.

(2) The tube diameter at the connection portion between the hopper and the air channel is smaller than the diameter at the remaining portions of the air channel.

(3) A blower 14 and an air intake port 13 provide a high velocity air stream in the channel 12 and an air inlet 17-1 is provided in the channel for receiving air which is sent from an air heater-humidifier 15 outside the air channel and whose temperature and humidity are adjusted.

(4) A sample fitting frame for the snow deposition test is placed near the air outlet of the air channel so that the dry snow can be wetted inside the air channel and the snow deposition test can be carried out. The fitting angle between the air channel and the snow falling apparatus may be either orthogonal or slanted.

The present invention provides an artificial snow wetting apparatus which exhibits the following action.

The dry snow obtained from the artificial snow falling apparatus is introduced into the air channel disposed in the test chamber of the snow falling apparatus. While the dry snow is passed through the air channel together with the high velocity air stream of the air channel, the hot and wet air adjusted separately is blown into the air channel through a large number of small holes from outside the air channel so as to melt the surface of the snow and to change the snow to a wet snow in a state where it is covered with water. This wet snow is blown by the high velocity air stream towards the testpiece and deposited thereon.

DESCRIPTION OF THE PREFERRED EMBODIMENTS

Hereinafter, a preferred embodiment of the present invention will be described in detail with reference to the accompanying drawings.

Figure 1:
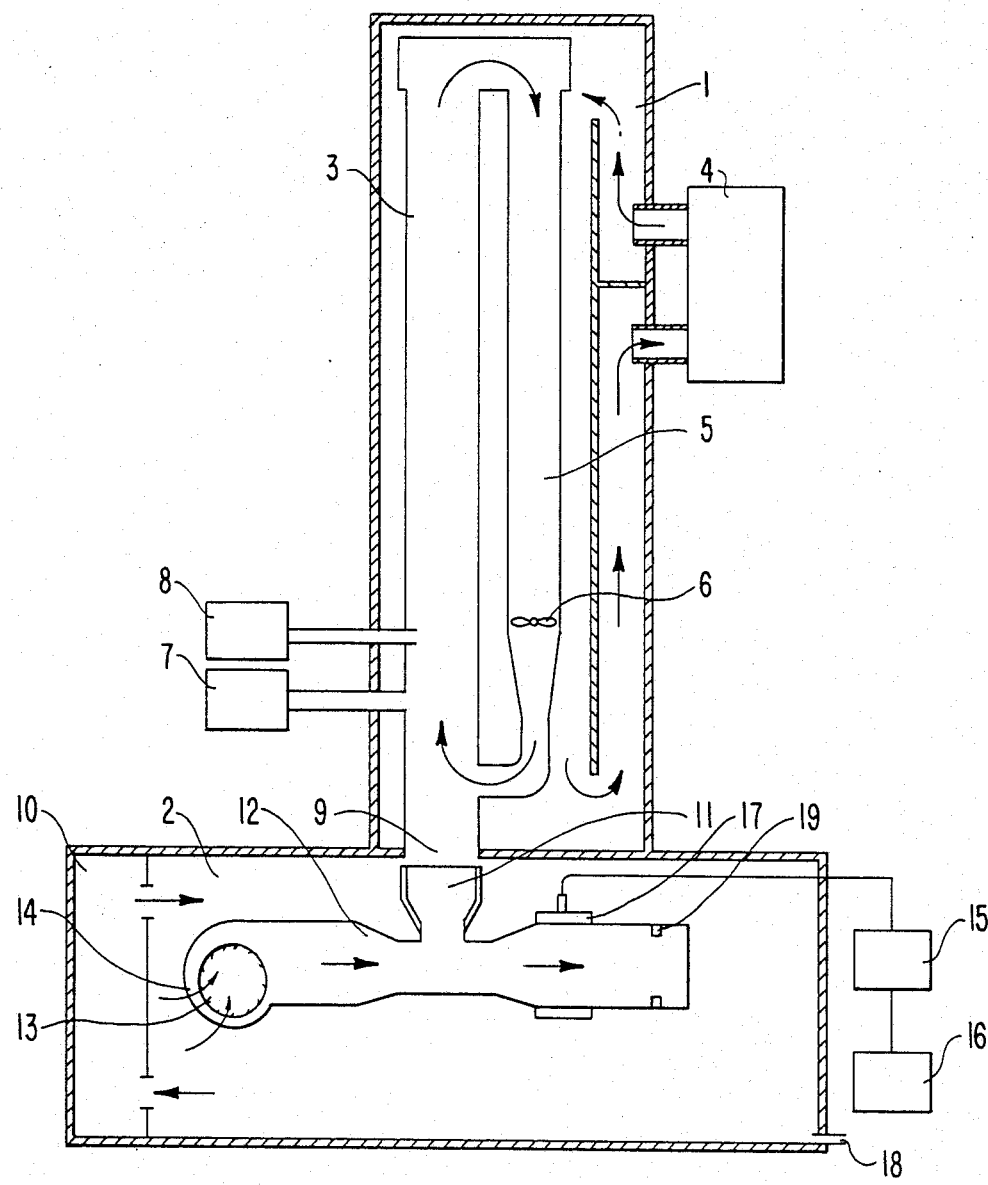
FIG. 1 is an overall view of an artificial snow wetting apparatus modified according to the invention.

FIG. 1 shows the artificial snow wetting apparatus in accordance with the present invention as a whole. The snow wetting apparatus comprises a cooling tower 1 located over a test chamber 2, and an air channel 12 is disposed inside the test chamber 2 in accordance with the concept of the present invention.

(1) Description of portions of a known artificial snow making apparatus:

In FIG. 1, the cooling tower 1, its internal structure, the test chamber 2 and a second cooler-conditioner 10 inside the test chamber 2 are heretofore known portions and the test chamber 2 is known as a snow falling chamber. This structure is shown in more detail and further explained in allowed commonly assigned copending U.S. patent application Ser. No. 06/920,194 filed on Oct. 17, 1986, the disclosure of which is hereby incorporated by reference.

The air inside the cooling tower 1 is circulated by a circulation fan inside a first cooler-conditioner 4 and its temperature is adjusted by a cooler and a heater. The air inside an inner cylinder 3 located within the cooling tower 1 is passed from the upper part to the lower part of an air velocity adjustment air course pipe 5 by a variable speed blower 6 and circulated as an ascending current inside the inner cylinder 3.

The temperature inside the inner cylinder 3 is regulated indirectly by adjusting the air temperature inside the cooling tower 1 around the outer periphery of the inner cylinder 3 by the first cooling-conditioner 4, and its temperature is from about −5° to −20° C.

Clouds are supplied into the inner cylinder 3 by a cloud making machine 7 and snow seeds (ice crystals) used as the nuclei for forming the snow are supplied into the inner cylinder 3 by a snow seed feeder 8.

Inside the inner cylinder 3 which is cooled to −15° C., for example, this snow falling apparatus generates the cloud and the snow is generated from the snow seed ice crystals. A gentle ascending current is provided inside the inner cylinder 3 such that the snow crystal grows to a large crystal size and weight until the snow crystal falls due to gravitational forces. The snow falls as fine flakes when the ascending current is slow and the snow grows to large snow flakes when the ascending current is fast.

The snow falls into the test chamber 2 if the temperature inside the test chamber 2 (snow falling chamber) is adjusted to a temperature equal to, or a little bit lower than, the temperature inside the inner cylinder 3.

If the temperature inside the test chamber 2 (snow falling chamber) is higher than the temperature of the inner cylinder, an ascending current develops inside the inner cylinder 3 due to the temperature difference and this ascending current is cooled at the upper part of the inner cylinder and turns into a descending current, thereby causing convection. Accordingly, the snow seed falls as it is before it grows to a snow flake inside the inner cylinder 3.

Figure 2:
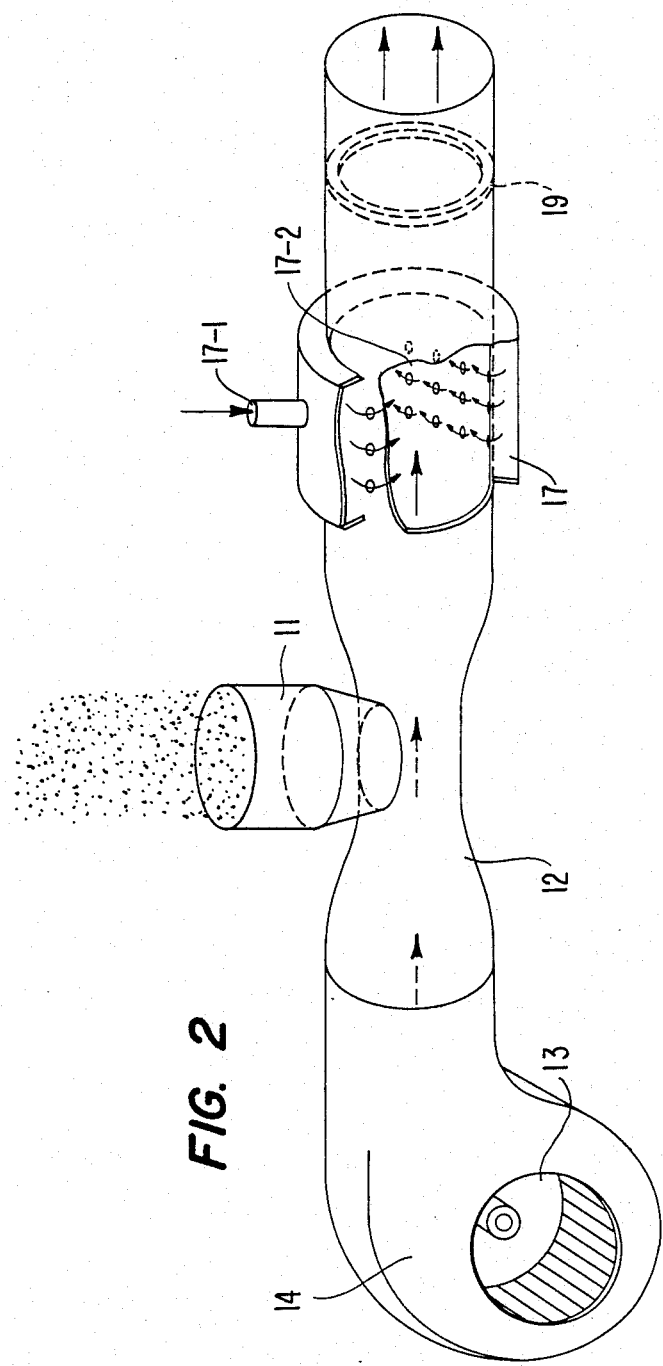
FIG. 2 is a partial view of a horizontal type air channel portion of the snow wetting apparatus shown in FIG. 1.

(2) Description of the snow wetting apparatus of the present invention:

FIG. 1 shows a portion of an air channel 12 inside the test chamber 2 according to the present invention, and an example of its detailed structure is shown in FIG. 2.

Snow wetting in this apparatus is effected in the following way. The dry snow formed inside the inner cylinder 3 of the snow falling apparatus falls into the air channel 12 through a hopper 11. An air intake port 13 and a blower 14 are disposed at one of the ends of the air channel 12 in order to suck in air from inside the test chamber 2 and to blow it at a high velocity to the other end of the air channel 12. A portion of the air channel 12 is in the form of a double pipe section 17, the outer jacket of which covers part of the outside of the air channel 12 in front (downstream) or at the back (upstream) of the hopper fitting portion of the air channel 12. A large number of circumferentially distributed small holes 17-2 forming air outlets are bored at the inner portion of the double pipe so as to be in fluid communication with the interior of the air channel 12. An air inlet 17-1 is fitted to the jacket of the double pipe so that the air sent from outside thereof is blown into the air channel 12 from its periphery.

An air heater-humidifier 15 in fluid communication with the interior of the double pipe 17 sends humidified air into the air channel 12. The air heater-humidifier determines the temperature and humidity of the heated and humidified air necessary for wetting the snow from the moisture content of the wet snow to be obtained and the wind velocity, heats and humidifies a predetermined amount of air and sends it to the air outlets 17-2 by means of a blower 16. The snow which falls into the air channel 12 from the hopper 11 is sent together with the air stream coming from the blower 14 inside the air channel 12 and while it is mixed with warm and moist treated air discharged into the air channel 12 from the air outlets 17-2, the snow is wetted. The treated air blown into the air channel 12 from the air outlets 17-2 for the heated and humidified air is heated to 14° to 16° C. so that the surface of the snow flying inside the air channel is heated and the snow is partly molten. Since the treated air is humidified to 80 to 90% relative humidity (R.H.) and prevents the evaporation of the water of the molten snow covering the surface of the snow, snow having a desired moisture content can be made to impinge against the sample near a sample fitting frame 19 at the end of the air channel 12 by adjusting the temperature and humidity of the treated air. The air discharged from the air channel 12 is cooled by a second cooler-conditioner 10 inside the test chamber 2 to a temperature substantially equal to the temperature of the air at an opening 9 at the lower end of the inner cylinder 3. The excessive water content in the air precipitates on the wall of the test chamber 2 in mist form or as droplets and this water is discharged outside the test chamber together with the excessive air from a discharge port 18 which can be located along the bottom of the test chamber 2. The cooled air inside the test chamber 2 is again sucked into the air channel 12 by the blower 14 of the air channel. In other words, most of the air circulates in the air channel 12 and the test chamber 2, and the air quantity corresponding to the air quantity that is blown into the air channel 12 from the air outlets 17-2 and the water formed by cooling are discharged outside the test chamber. In order to prevent the air flowing through the air channel 12 from entering the inner cylinder 3 of the snow falling apparatus through the hopper 11 and from causing a condition of ascending current inside the inner cylinder 3, the diameter of the hopper fitting portion of the air channel 12 is smaller than the pipe diameter upstream and downstream thereof. A negative pressure develops at this reduced diameter portion due to the venturi effect and the air inside the hopper 11 is sucked slightly into the air channel 12. When the condition of ascending current develops inside the inner cylinder 3 due to the temperature difference, convection occurs in the inner cylinder 3 with the result that snow seeds which have not yet grown to snow flake size and small snow crystals fall as such while being carried by the descending current and enter the air channel 12 from the hopper 11, whereby a desired wet snow condition cannot be obtained. The venturi negative pressure described above prevents this problem.

EXAMPLE 1

An example of air channel conditions according to the invention is as follows:

inner diameter of air channel: 25 cm$\phi$
inner diameter of venturi portion of air channel: 16 cm$\phi$
full length of air channel: 860 cm
length of venturi portion: 20 cm
circulating air quantity: 34 m$^3$/min
quantity of temperature/humidity adjusted air: 4.1 m$^3$/min
air temperature at outlet of air channel: 2.1° C.
temperature of temperature/humidity adjusted air: 15.3° C.
humidity of temperature/humidity adjusted air: 86% R.H.

When a power cable having a diameter of 12 mm$\phi$ is placed at a position 20 cm from the outlet of the air channel as a testpiece for the snow deposition test under the conditions as described above, the moisture content of the deposited snow is from 15 to 25%.

Figure 3:
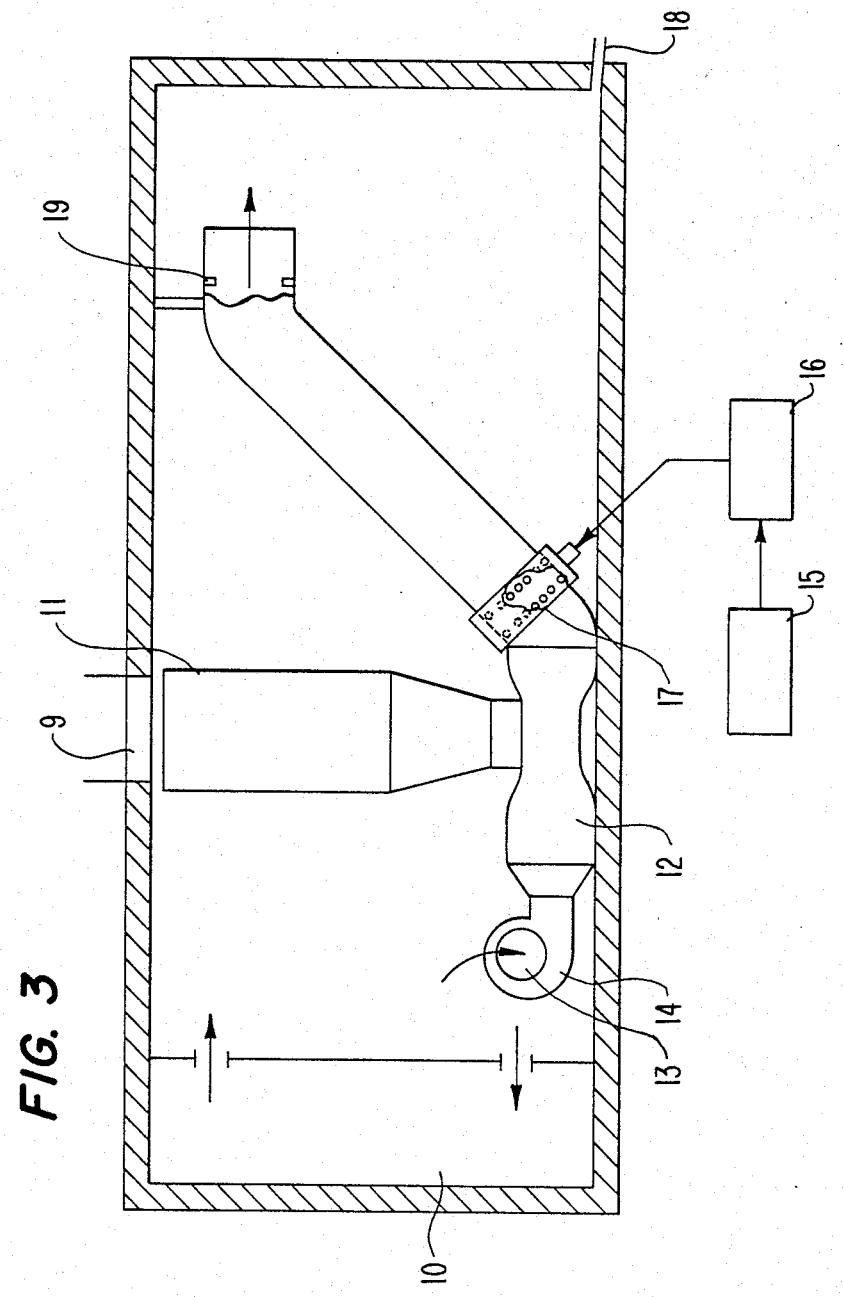
FIG. 3 is a partial view of an inclination type air channel portion of the modified snow wetting apparatus of the invention.

In addition, the structure such as shown in FIG. 3, wherein the air channel is fitted slantingly to the inner cylinder can also be employed. In such a case, there is obtained the advantage that the entire length of the air channel can be reduced.

The present invention having the construction described above provides the following effects. The dry snow having the same property as the snow in the natural world is taken into the air channel disposed inside the test chamber without affecting the air stream and temperature in the inner cylinder of the artificial snow falling machine. While the snow flows through the air channel together with a high velocity air stream, it is mixed with the heated and humidified air so that the surface of the snow is partly melted to water. While this water covers the entire surface of the snow, the wet snow having the same property as the wet snow in the natural world impinges against the sample in the strong wind and provides the same deposited snow as the deposited snow occurring in the natural world.

As a result, the present invention contributes greatly to the study of the snow deposition mechanism onto a power cable, to the method of preventing such snow deposition and to the development of covering materials. The present invention will eventually lead to prevention of accidents resulting from snow deposition on power cables which has become a danger to society in recent years. Furthermore, the present invention will contribute greatly to the research and development of airplanes, automobiles, roofing materials and so forth.

Though the present invention has thus been described with reference to the preferred embodiments thereof, the invention is not particularly limited thereto but can be changed or modified in various manners by those skilled in the art without departing from the scope and spirit thereof.

What is claimed is:

1. An artificial snow making apparatus including means for changing artificial snow generated therein to wet snow, comprising:
   a vertical inner cylinder;
   an outer tank around said inner cylinder;
   an air velocity adjusting duct means connected between a top portion of said inner cylinder and an intermediate portion of said inner cylinder for causing air to flow from the top portion of said inner cylinder to said intermediate portion and to flow upwardly in said inner cylinder, said duct means including means therein for adjusting the velocity of the air flowing therethrough for thereby adjusting the velocity of the air flowing in said inner cylinder;
   a cloud making machine and a seeding device connected directly to said vertical inner cylinder at positions between the top portion and said intermediate portion thereof;
   a cooling unit disposed inside said outer tank for cooling air in said outer tank for cooling said inner cylinder;
   a test chamber located below a lower portion of said inner cylinder;
   air channel means disposed in said test chamber and in fluid communication with said lower end of said inner cylinder for receiving snow generated in said inner cylinder;
   a blower means connected to said air channel means for circulating air from said test chamber in a flow direction along an air flow path through said air channel means and for blowing snow generated in said inner cylinder through said air channel means along said air flow path;
   a temperature and humidity control means connected to said air channel means for drawing air from said test chamber and adjusting the temperature and humidity thereof to a temperature and humidity higher than the temperature and humidity of snow generated in said inner cylinder, whereby snow generated in said inner cylinder is changed to wet snow as it passes through said air channel means.

2. An apparatus as claimed in claim 1, wherein said air channel means comprises an elongated tube extending in a longitudinal direction, a portion of said tube located below said lower portion of said inner cylinder having a cross-section taken in a plane perpendicular to said longitudinal direction which is reduced compared to portions of said tube which are upstream and downstream of said inner cylinder with respect to said flow direction.

3. An apparatus as claimed in claim 1, wherein said temperature and humidity control means includes a jacket mounted around said air channel means at a position downstream of said inner cylinder with respect to said flow direction.

4. An apparatus as claimed in claim 1, wherein said temperature and humidity control means includes a blower for drawing air from said test chamber, a heater-humidifier for adjusting the temperature and humidity of the thus drawn air, and a jacket around said air channel means for directing the thus heated and humidified air into said air channel means.

5. An apparatus as claimed in claim 1, further comprising frame means fixed to said channel means for exposing a test sample to snow which has been changed to wet snow by said temperature and humidity control means.

6. An apparatus as claimed in claim 2, wherein said air channel means has a plurality of air holes therein arranged in a circumferential pattern to which said temperature and humidity control means is connected for supplying the temperature and humidity adjusted air into said air channel means.

7. An apparatus as claimed in claim 5, wherein said frame means comprises a frame mounted along said flow path in said air channel means, said frame being downstream of said temperature and humidity control means with respect to said flow direction.

8. An apparatus as claimed in claim 1, wherein said air flow path is constricted at a position where said air channel means is in fluid communication with said inner cylinder.

9. An apparatus as claimed in claim 1, wherein said inner cylinder is connected to said air channel means by a hopper, said hopper having an opening therein connected to said air channel means which is smaller than an opening therein connected to said inner cylinder.

10. An apparatus as claimed in claim 1, wherein said test chamber includes a discharge port for discharging water out of said test chamber.

11. An apparatus as claimed in claim 1, wherein said flow direction is perpendicular to a central axis of said inner cylinder.

12. An apparatus as claimed in claim 1, wherein said flow direction along a portion of said flow path is inclined with respect to a central axis of said inner cylinder.

13. An apparatus as claimed in claim 1, wherein a cooling unit is disposed within said test chamber for cooling said air channel means.

* * * * *